US009744888B1

(12) United States Patent
Hall et al.

(10) Patent No.: US 9,744,888 B1
(45) Date of Patent: Aug. 29, 2017

(54) INTEGRATED COOLING SYSTEM FOR AN ADJUSTABLE HEADREST ASSEMBLY (71) Applicant: Ford Global Technologies, LLC, Dearborn, MI (US)

(72) Inventors: Amber LaVerne Hall, Oak Park, MI (US); Michael Kolich, Windsor (CA); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/041,324

(22) Filed: Feb. 11, 2016

(51) Int. Cl.
*B60N 2/48* (2006.01)
*B60N 2/06* (2006.01)
*B60N 2/56* (2006.01)

(52) U.S. Cl.
CPC ............ *B60N 2/4876* (2013.01); *B60N 2/06* (2013.01); *B60N 2/5671* (2013.01); *B60N 2/5678* (2013.01); *B60N 2/5692* (2013.01)

(58) Field of Classification Search
CPC ...... B60N 2/4876; B60N 2/06; B60N 2/5671; B60N 2/5678; B60N 2/5692
USPC ............................ 297/391, 180.12, 180.13
See application file for complete search history.

(56) References Cited

U.S. PATENT DOCUMENTS

| 3,101,660 | A | 8/1963 | Taylor |
| 5,450,894 | A | 9/1995 | Inoue et al. |
| 6,746,076 | B2 | 6/2004 | Bogisch et al. |
| 8,220,869 | B2 | 7/2012 | Kolich |
| 2006/0273646 | A1 | 12/2006 | Comiskey et al. |
| 2008/0036249 | A1* | 2/2008 | Heckmann ........... B60N 2/5657 297/180.13 X |
| 2014/0203599 | A1 | 7/2014 | Line et al. |
| 2016/0052361 | A1* | 2/2016 | Yamashita ............. B60G 13/08 188/266.1 |

FOREIGN PATENT DOCUMENTS

| DE | 10160799 A1 | 9/2002 |
| DE | 10106355 C1 | 10/2002 |
| DE | 102008022597 A1 * | 9/2009 ........... B60N 2/5657 |
| JP | 2010076652 A * | 4/2010 |

* cited by examiner

*Primary Examiner* — Anthony D Barfield
(74) *Attorney, Agent, or Firm* — Vichit Chea; Price Heneveld LLP (57) ABSTRACT A headrest assembly is removeably supported on a vehicle seat having a seatback with a seatback frame. The headrest assembly includes a headrest bun operably coupled to a housing via a powered linkage system for driving the headrest bun between extended and retracted positions. A temperature control system is disposed in the housing and configured to provide treated air to a conditioning area disposed below the headrest bun at a vehicle occupant's neck. The temperature control system includes a blower operably coupled to duct assembly for blowing air treated by a thermoelectric module along the duct assembly. One or more vents are disposed at a downward angle on a front portion of the housing. The one or more vents are operably coupled to and in communication with the duct assembly.

20 Claims, 13 Drawing Sheets

INTEGRATED COOLING SYSTEM FOR AN ADJUSTABLE HEADREST ASSEMBLY

FIELD OF THE INVENTION

The present invention generally relates to a headrest assembly for a vehicle seat, and more particularly, to an adjustable headrest assembly having an integrated cooling system configured to provide a climate control feature for a vehicle occupant at the headrest assembly.

BACKGROUND OF THE INVENTION

In the automotive industry, a number of headrests or head restraints are available on vehicle seats that include systems for adjusting a position of the headrest to accommodate a variety of vehicle occupants and their specific support needs. Adjustment systems, particularly powered systems, can take up a considerable amount of space which is at a premium at the headrest. Thus, a headrest assembly that can provide adequate adjustment is desired in order to satisfy the needs of various vehicle occupants, and further, providing a climate control feature within the constraints to of the headrest assembly is also desired.

SUMMARY OF THE INVENTION

One aspect of the present invention includes a headrest assembly having a housing and a headrest bun. The headrest bun is adjustable between extended and retracted positions relative to the housing. A duct assembly is disposed in the housing. A thermoelectric module is in communication with the duct assembly and configured to provide treated air. One or more vents are positioned on the housing and configured to deliver the treated air to a conditioning area disposed below the headrest bun.

Another aspect of the present invention includes a headrest assembly removeably supported on a seat having a seatback with a seatback frame. The headrest assembly includes a headrest bun operably coupled to a housing via a linkage system for driving the headrest bun between extended and retracted positions. A temperature control system is disposed in the housing and configured to provide treated air to a conditioning area disposed below the headrest bun. The temperature control system includes a blower operably coupled to duct assembly for blowing treated air along the duct assembly. One or more vents are disposed at a downward angle on a front portion of the housing. The one or more vents are in communication with the duct assembly.

Yet, another aspect of the present invention includes a includes a headrest assembly having a housing and a headrest bun adjustable between extended and retracted positions relative to the housing via a powered linkage system. A temperature control system includes a blower coupled to a duct assembly for delivering air from one or more vents disposed on the housing to a conditioning area disposed below the headrest bun.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
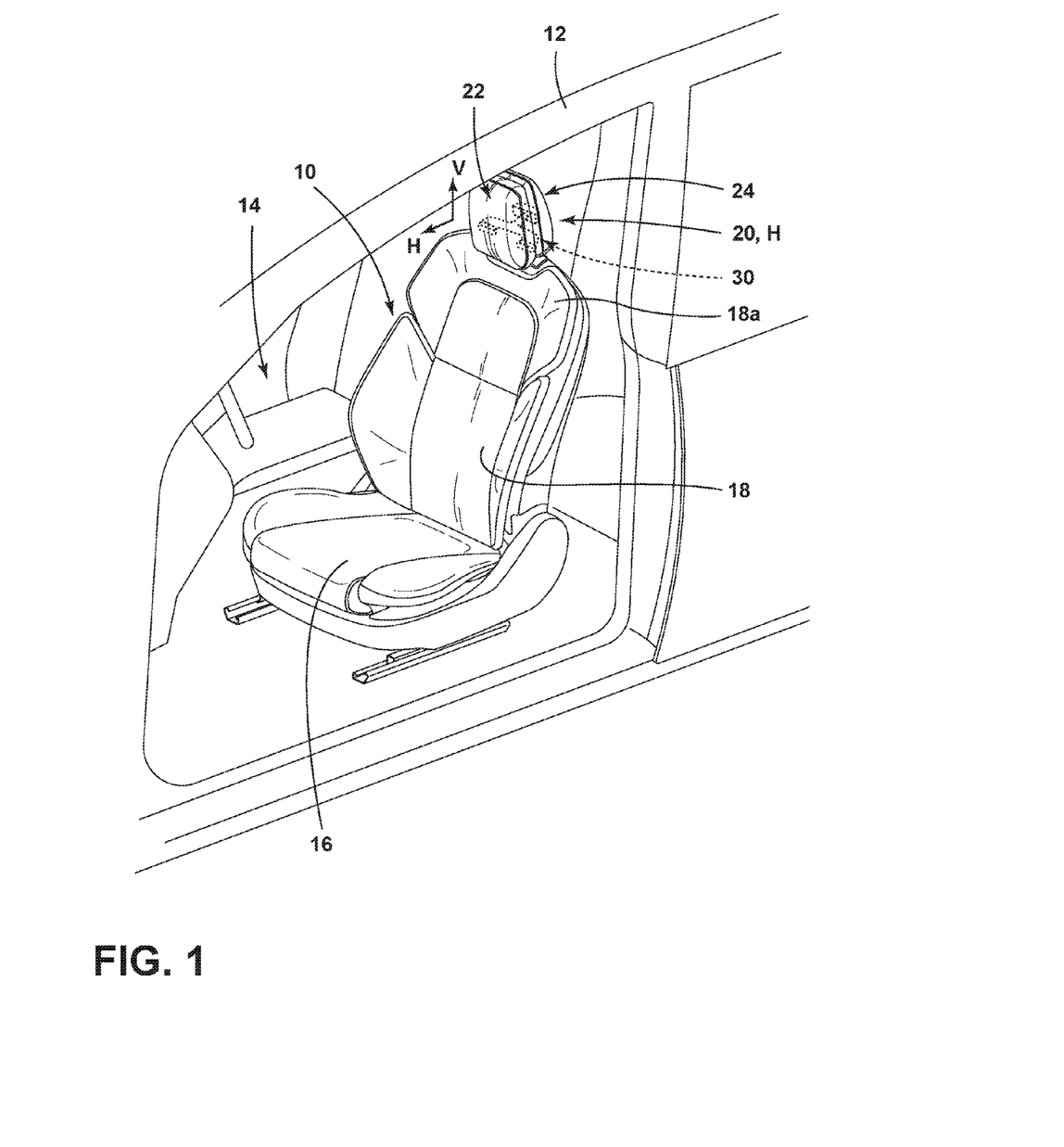
FIG. 1 is a front perspective view of a vehicle seat having a headrest assembly according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a vehicle seat 10 is shown disposed within a vehicle interior 14 of a vehicle 12. The vehicle seat 10 includes a seat portion 16 which is coupled to a seatback 18. The seatback 18 includes an upper portion 18a having a headrest assembly 20 mounted thereon. The headrest assembly 20 includes a housing 24 that is a rear housing disposed adjacent to an adjustable headrest bun 22. The headrest bun 22 is contemplated to be a cushioned member configured to support the head of a vehicle occupant seated in the vehicle seat 10. Disposed within the housing 24, a temperature control system 30 is disposed for providing a heating or cooling effect for a vehicle occupant, as further described below. The vehicle seat 10 of FIG. 1 is shown as a driver's side vehicle seat, however, it is contemplated that the headrest assembly 20 of the present invention may be disposed on any vehicle seat within a vehicle, including passenger seats, rear seats, folding seats and third row passenger seat options. As such, the headrest assembly 20 shown in FIG. 1 is not intended to limit the spirit of the invention as shown on a front driver's side vehicle seat 10.

As noted above, the headrest assembly 20 is an adjustable headrest assembly, wherein the headrest bun 22 is contemplated to be adjustable in a horizontal direction, as indicated by arrow H (between extended and retracted positions), as well as a vertical direction, as indicated by arrow V (between raised and lowered positions), relative to the housing 24. In the position shown in FIG. 1, the headrest assembly 20 is contemplated to be in a home position H which correlates to the headrest bun 22 being in the lowered vertical position and the retraced horizontal position, such that the headrest bun 22 is disposed directly in front of the housing 24. Movement of the headrest bun 22 is contemplated to be powered by one or more powered adjustment mechanisms that are substantially concealed by the housing 24 when the headrest assembly 20 is in the home position H. The adjustment mechanisms are further described below with reference to FIGS. 9A and 9B.

Figure 2:
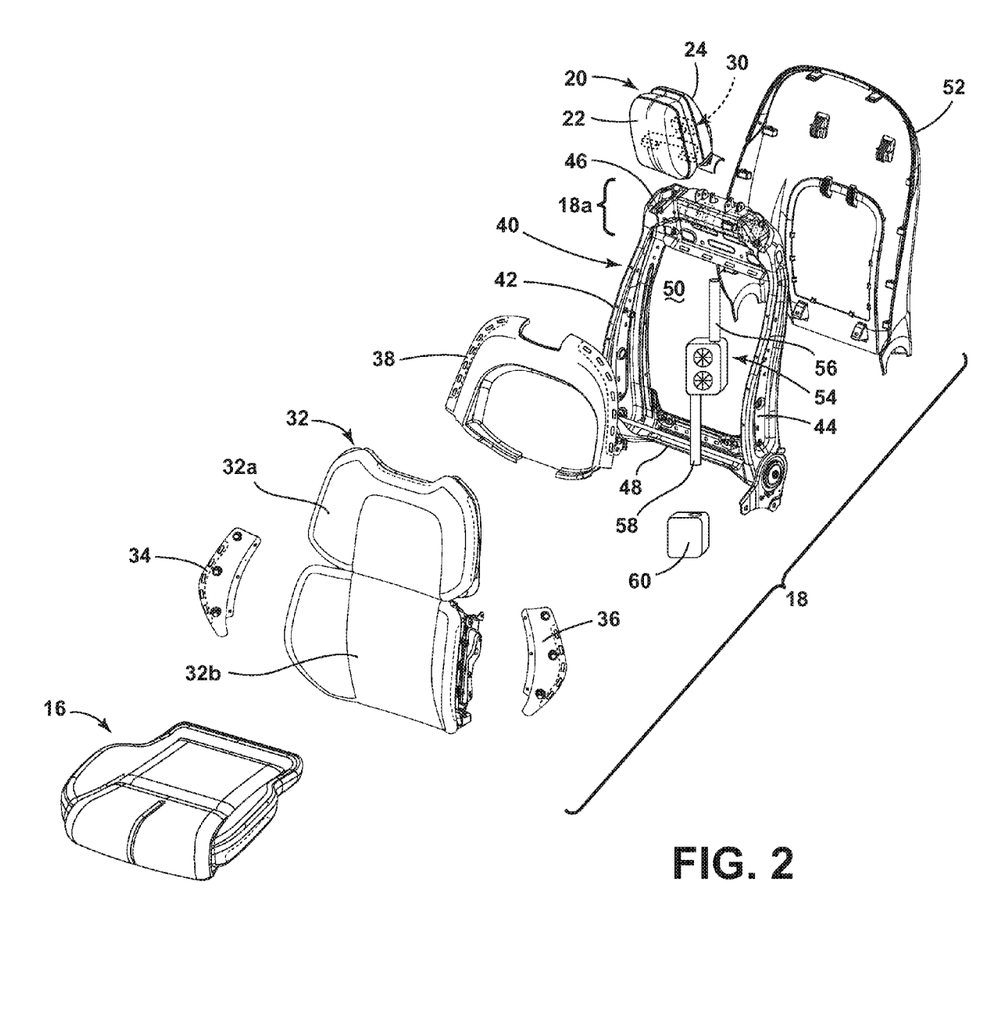
FIG. 2 is a partial exploded view of the vehicle seat of FIG. 1.

Referring now to FIG. 2, the vehicle seat 10 is shown in an exploded view with the seatback 18 exploded away from the seat portion 16. The seatback 18 includes a front carrier 32 having left and right side bolsters 34, 36. The front carrier 32 is contemplated be a cushioned member having upper and lower portions 32a, 32b configured to comfortably support a vehicle occupant. A support member 38 is further shown in FIG. 2 and configured to couple to the front carrier 32 at the upper portion 32a thereof. A seatback frame 40 includes first and second side members 42, 44 and upper and lower cross members 46, 48 which together define an interior space 50. The seatback frame 40 is contemplated to be a rigid member having sufficient strength to properly support a vehicle occupant at the seatback 18. A rear carrier 52 is disposed behind the seatback frame 40 and configured to couple to the seatback frame 40 as well as the front carrier 32. In the embodiment shown in FIG. 2, the spacing 50 is configured to be enclosed by the front carrier 32 and the rear carrier 52 and includes an air distribution system 54 having an upper conduit 56 and a lower conduit 58. The upper conduit 56 is contemplated to connect the air distribution system 54 to the headrest assembly 20, as further described below. The lower conduit 58 is configured to couple to a thermoelectric module 60 for providing treated air to be distributed through the front carrier 32 by the air distribution system 54. Thus, it is contemplated that portions of the front carrier 32 may include a perforated seat cover, along with a porous foam material or suitable ductwork to provide treated air to the vehicle occupant through the front carrier 32 by the air distribution system 54. Treated air from the thermoelectric module 60 may also be provided to the headrest assembly 20 via the upper conduit 56 for distribution by the temperature control system 30 of the headrest assembly 20, as further described below.

Figure 3:
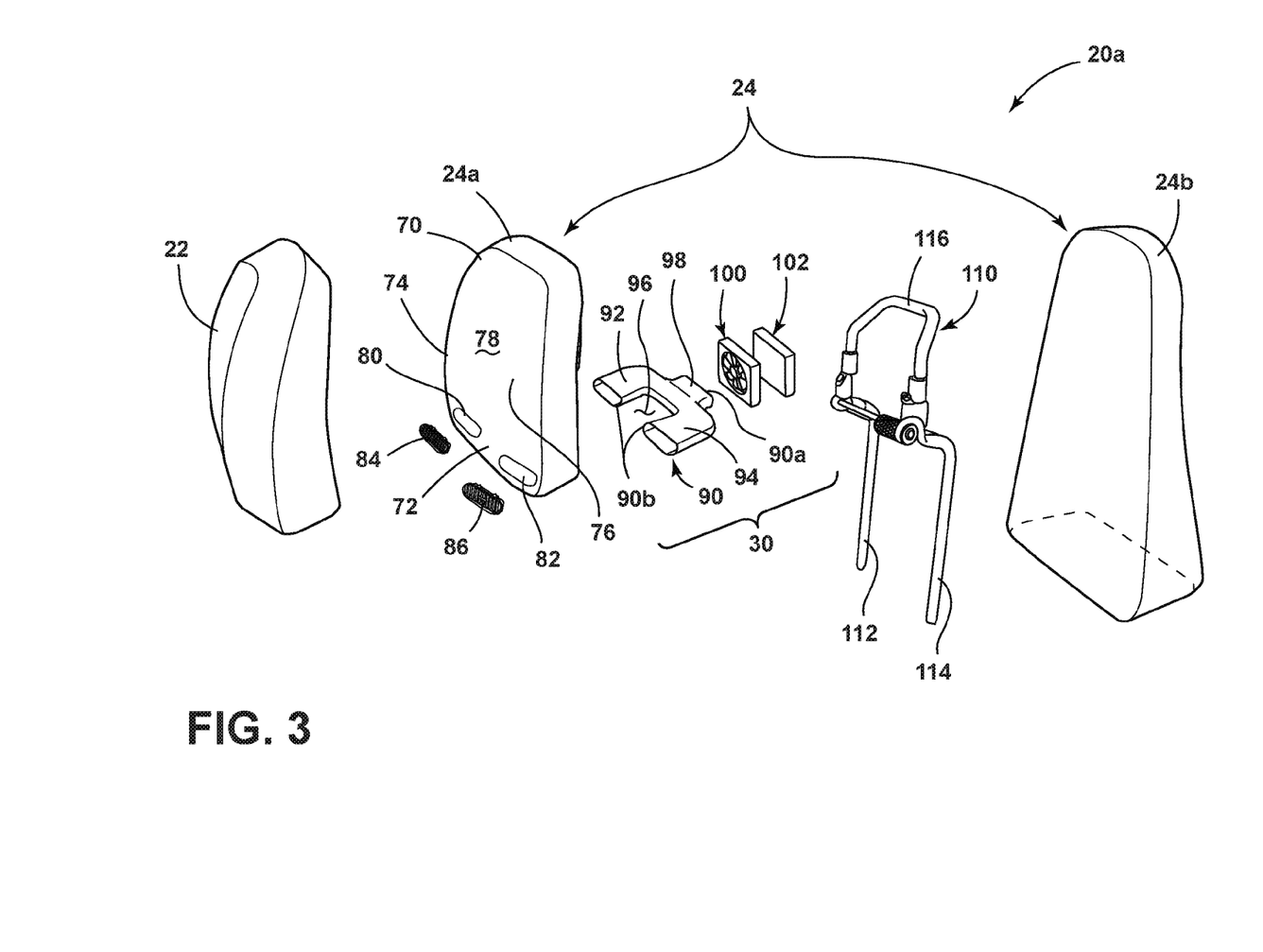
FIG. 3 is an exploded view of a headrest assembly according to another embodiment.

Referring now to FIG. 3, another embodiment of a headrest assembly 20A is shown in an exploded view. The headrest assembly 20A includes a headrest bun 22 exploded away from a front portion 24a of the housing 24. Thus, in the embodiment shown in FIG. 3, the housing 24 includes a front portion 24a and a rear portion 24b which are shrouds that couple together to cover and substantially conceal support mechanisms, adjustment mechanisms and thermal control systems in assembly. The front and rear portions 24a, 24b of the housing 24 are contemplated to be molded polymeric members that may be covered with any suitable covering. The front portion 24a of the housing 24 includes an upper portion 70 and a lower portion 72 having first and second sides 74, 76 disposed on a front wall 78 thereof. On the lower portion 72, first and second vent openings 80, 82 are disposed. The vent openings 80, 82 are configured to receive vent covers 84, 86 which are further configured to direct conditioned or treated air therethrough to a vehicle occupant. As further shown in FIG. 3, a duct assembly 90 includes first and second ventilation ducts 92, 94 which are spaced-apart to define a receiving recess 96 disposed therebetween. The first and second ventilation ducts 92, 94 branch off of a central ventilation duct 98, such that the central ventilation duct 98 defines a first side 90a of the duct assembly 90, while the first and second ventilation ducts 92, 94 to find a second side 90b be of the duct assembly 90. The first and second ventilation ducts 92, 94 are configured to align with the first and second vent openings 80, 82 of the front portion 24a of the housing 24 in assembly to provide air flow to the vehicle occupant through the headrest assembly 20.

As further shown in FIG. 3, a blower 100 is disposed adjacent to the duct assembly 90 at the first side 90a thereof. In assembly, the blower 100 is in communication with the central ventilation duct 98 to blow air through the first and second ventilation ducts 92, 94 and out through the front portion 24a of the housing 24 at vent openings 80, 82. The blower 100 is contemplated to be a fan or other like assembly capable of moving air through the duct assembly 90. The blower 100 is further contemplated to be disposed in communication with a thermoelectric module 102. The thermoelectric module 102, like the blower 100, is contemplated to be housed within the housing 24 of the headrest assembly 20. The thermoelectric module 102 is configured to provide treated air for routing through the duct assembly 90. The thermoelectric module 102 is contemplated to treat air and provide treated air to the vehicle occupant through the housing 24. As used herein, the term "treated air" refers to air that has been either heated or cooled by the thermoelectric module 102 to a desired temperature. While the thermoelectric module 102 is a preferred component for use in providing treated air to a vehicle occupant, it is contemplated that any other air treatment module can be used with the present invention for providing treated air to a vehicle occupant. The temperature control system 30 of the present invention is further described below in an assembled condition and substantially housed within the housing 24 of the headrest assembly 20.

With further reference to FIG. 3, a support member 110 is shown having first and second support posts 112, 114 and an upper cross member 116. The support member 110 is contemplated to be a rigid member configured to structurally support the headrest assembly 20A from the seatback frame, such as seatback frame 40 shown in FIG. 2 at the upper cross member 46 thereof. It is contemplated that the blower 100, the thermoelectric module 102, or both may be coupled to the support member 110 in assembly. The support member 110 may also serve as a mounting location for a linkage system used in conjunction with the present invention. As noted above, the headrest bun 22 is configured to move horizontally in the direction as indicated by arrow H in FIG. 1. This horizontal movement is contemplated to be driven by a powered linkage system as further described below with reference to FIGS. 9A and 9B. The housing 24 is configured to house the linkage system and the temperature control system 30, such that the receiving recess 96 disposed between the first and second ventilation ducts 92, 94 is configured to receive part of the linkage system therein. In this way, the first and second ventilation ducts 92, 94 are contemplated to be routed around the linkage system disposed within the housing 24 of the headrest assembly 20A at receiving recess 96.

Figure 4A:
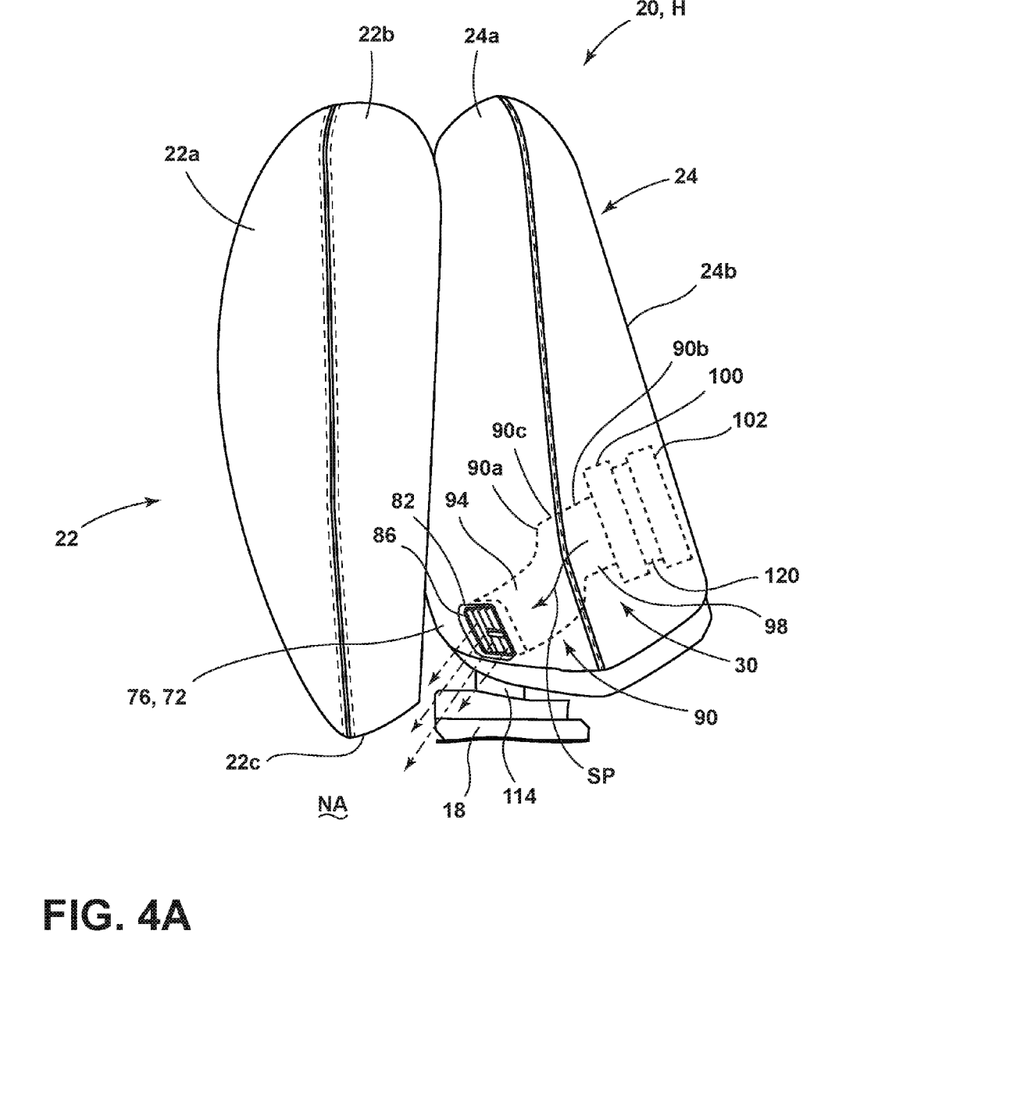
FIG. 4A is a side elevational view of a headrest assembly according to another embodiment, with a temperature control system shown in phantom.

Referring now to FIG. 4A, the headrest assembly 20 is shown in the home position H with the headrest bun 22 disposed directly adjacent to the housing 24. The headrest bun 22 is shown as a two-piece member having a cushioned front portion 22a, and a rear coupling portion 22b. The cushioned front portion 22a is configured for engagement or abutting support by a vehicle occupant in use. The rear coupling portion 22b is contemplated to couple the headrest bun 22 to a linkage system as further described below. In FIG. 4A, the headrest bun 22 is in a retracted position, as well as a lowered position relative to the housing 24. With the headrest bun 22 in this position, the temperature control system 30 must be directed at a downward angle to provide treated air below a lowermost portion 22c of the headrest bun 22. In the embodiment shown in FIG. 4A, the temperature control system 30 is directed at a neck area NA where a rear-side of a vehicle occupant's neck is contemplated to be positioned relative to the headrest assembly 20. The neck area NA may also be referred to as a conditioning area where treated air from the temperature control system 30 is directed in use. Thus, the duct assembly 90 is shown as providing treated air through the lower portion 72 of the front portion 24a of the housing 24 at vent opening 82. The treated air is further passed through the vent cover 86 at vent opening 82 and directed downward towards the neck area NA as indicated by the dashed arrows in FIG. 4A. The treated air is provided by the thermoelectric module 102 in a manner as described above. The treated air provided by the thermoelectric module 102 is shown in FIG. 4A as being directed towards the blower 100 through a collection compartment 120. The collection compartment 120 may also be used to house treated air for a subsequent distribution by the blower 100 once the treated air has reached a desired temperature within the collection compartment 120. It is further contemplated that the temperature control system 30 may have the thermoelectric module 102 disposed directly adjacent to the blower 100 for providing treated air through the duct assembly 90. As further shown in FIG. 4A, the blower 100 is configured to blow air through the duct assembly 90 along the supply path as indicated by arrow SP. In this way, the treated air from the thermoelectric module 102 is propelled by the blower 100 along the supply path SP from the central ventilation duct 98 to the first and second ventilation ducts 92, 94 of the duct assembly 90.

Figure 4B:
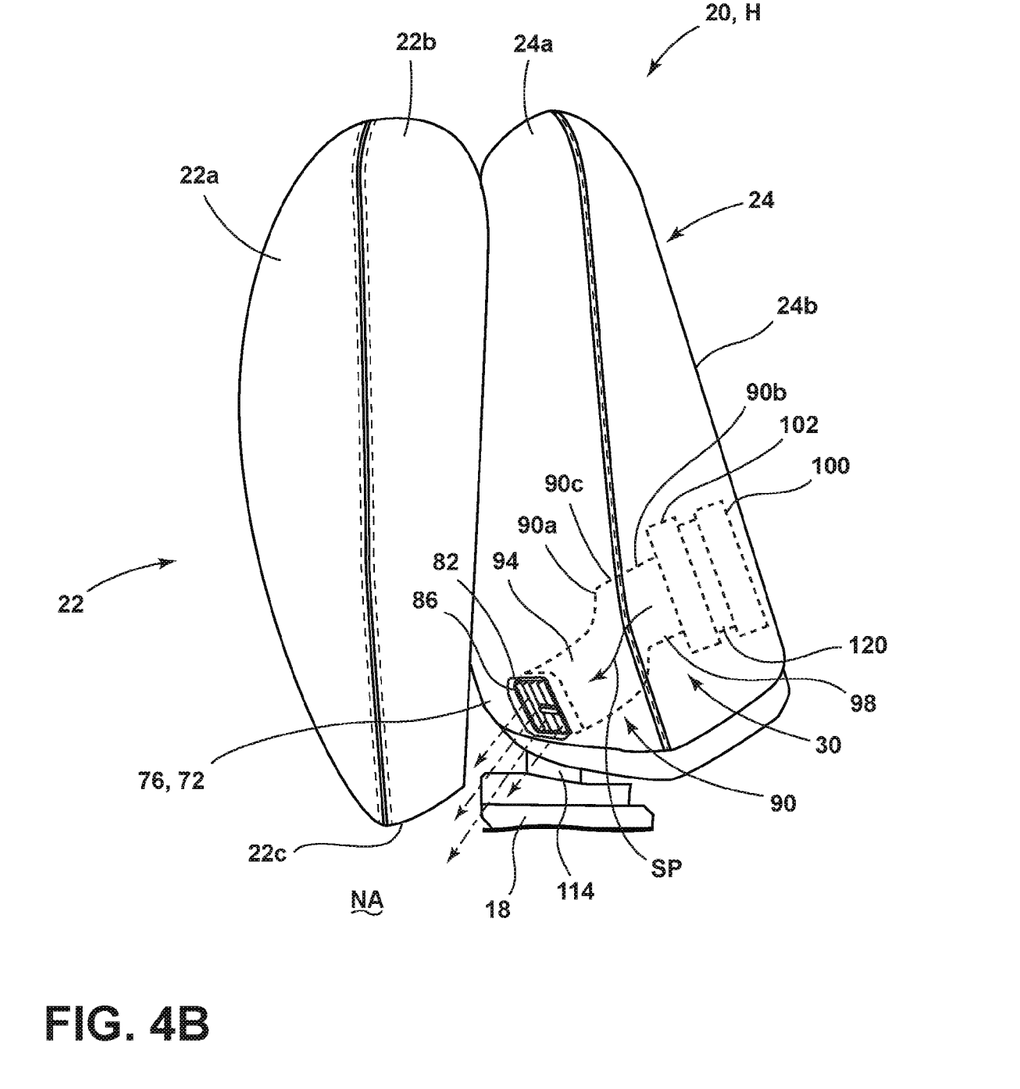
FIG. 4B is a side elevational view of a headrest assembly according to another embodiment, with a temperature control system shown in phantom.
Figure 4C:
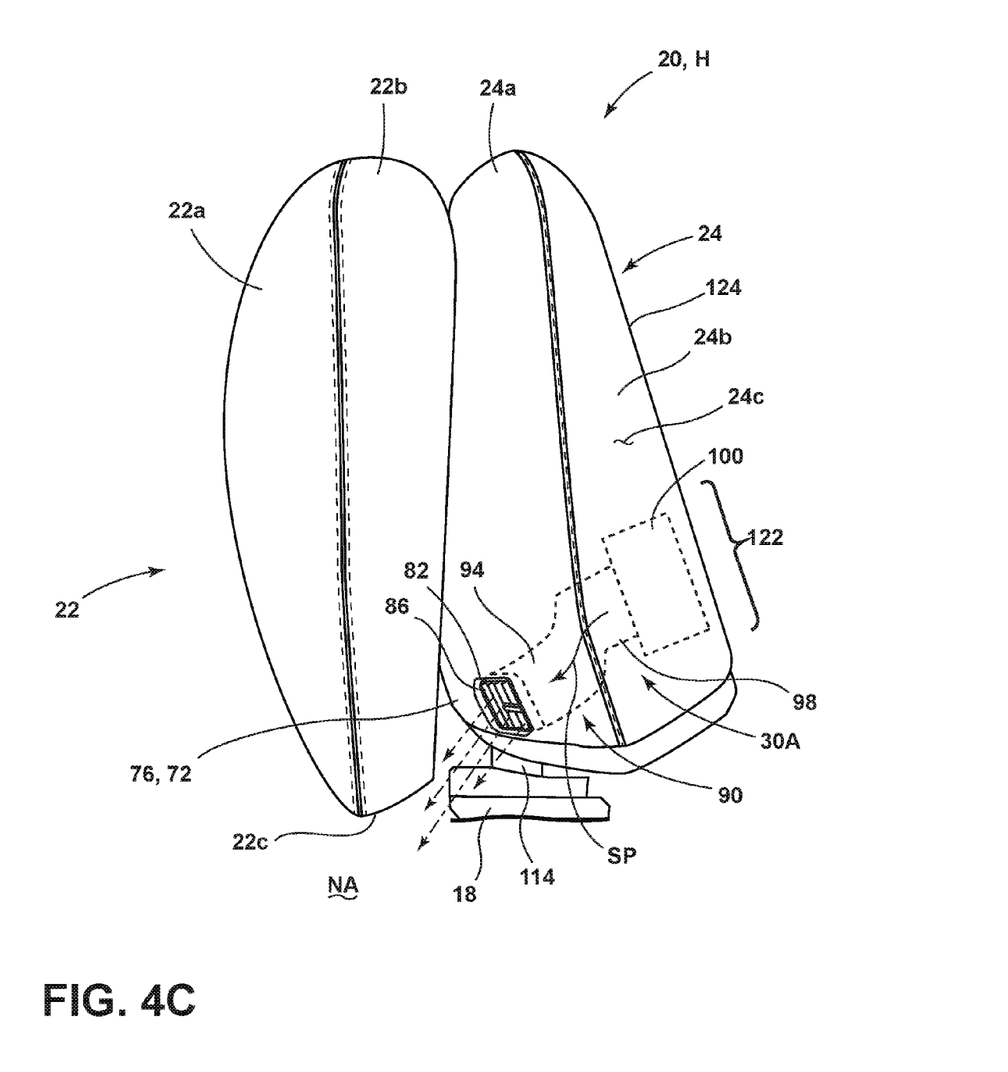
FIG. 4C is a side elevational view of a headrest assembly according to another embodiment, with a temperature control system shown in phantom.
Figure 7A:
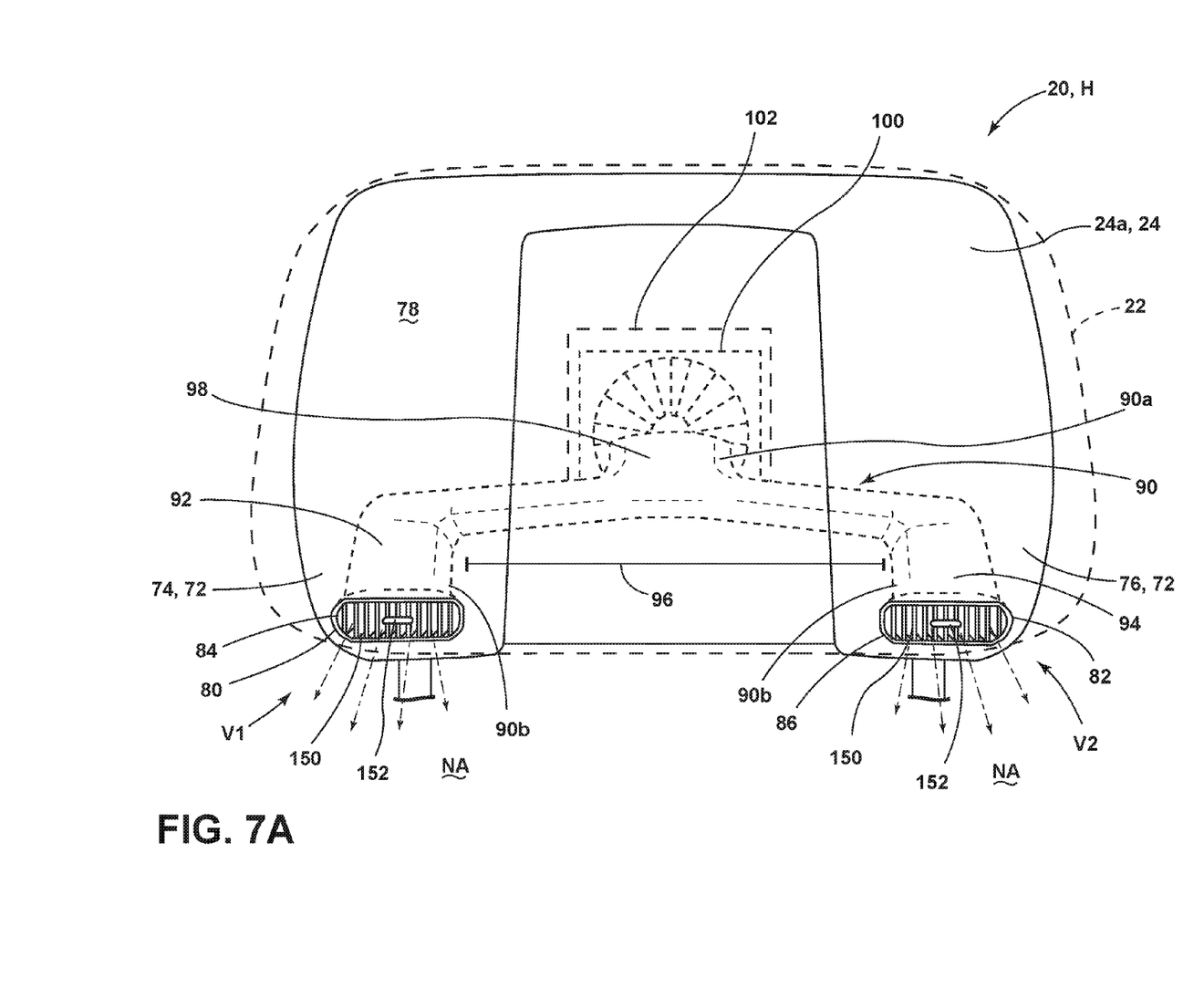
FIG. 7A is a front plan view of the headrest assembly of FIG. 4A with the headrest bun and the temperature control system shown in phantom.
Figure 7B:
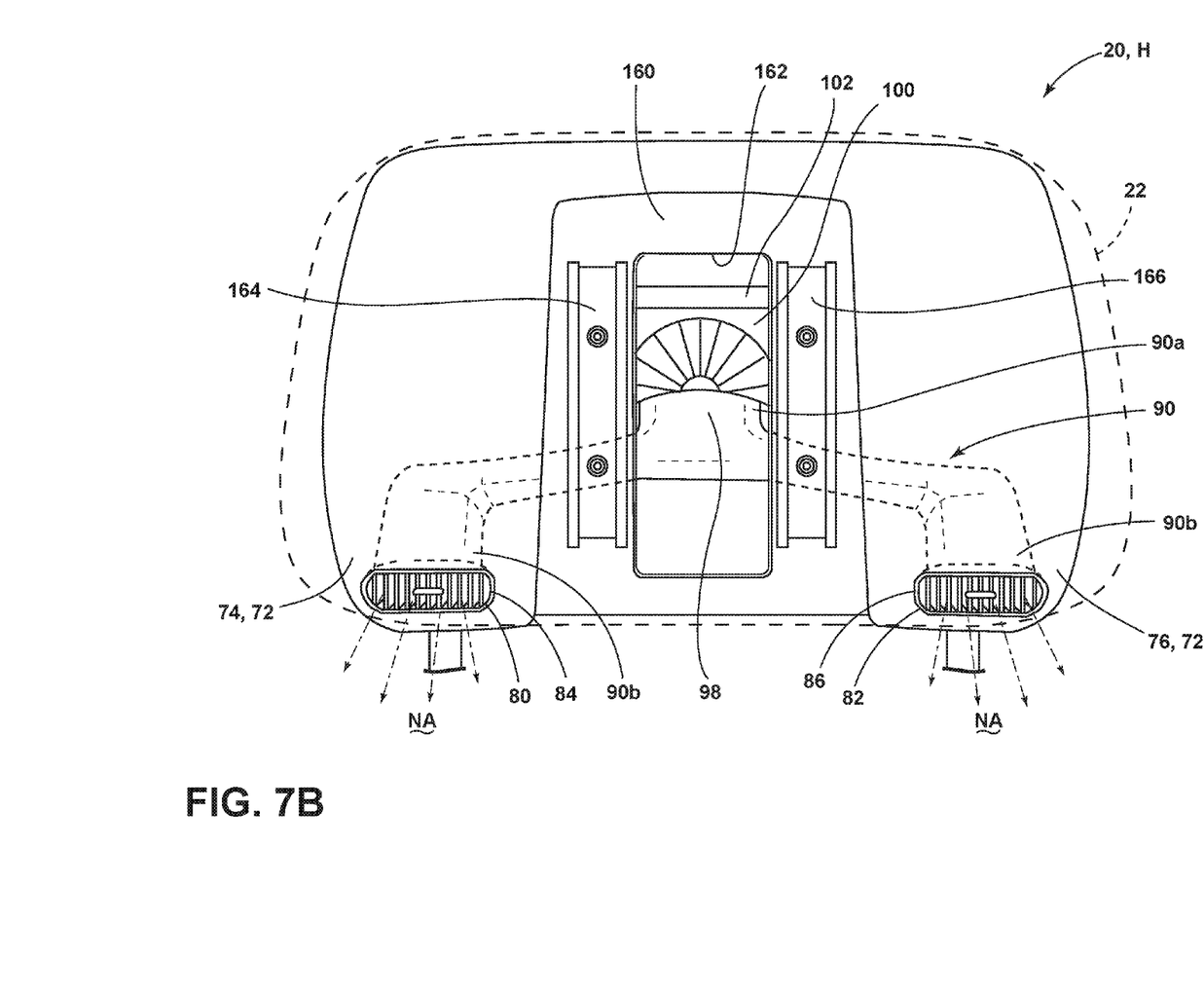
FIG. 7B is a front plan view of the headrest assembly of FIG. 7A having a mounting configuration for the headrest bun which is shown in phantom, along with parts of the temperature control system.

In FIG. 4A, as well as FIGS. 4B and 4C, only one side of the front portion 24a of the housing 24 is shown. Specifically, the second side 76 is shown on the lower portion 72 of the front portion 24a of the housing 24. As noted above, with reference to FIG. 2, the front portion 24a of the housing 24 includes first and second sides 74, 76 disposed on a front wall 78 thereof. Thus, the first side 74 is contemplated to have a similar system disposed thereon for providing treated air to the neck area NA. This dual vent system is best shown in FIGS. 7A and 7B and described below. While the present invention contemplates having multiple ducts used for providing treated air to the neck area NA, it is contemplated that a single duct may also be used with the present concept for providing a heating or cooling effect to a vehicle occupant.

Referring now to FIG. 4B, the headrest assembly 20 is shown in the home position H with the headrest bun 22 disposed directly adjacent to the housing 24. The temperature control system 30 of FIG. 4B is substantially similar to the temperature control system 30 of FIG. 4A. However, in FIG. 4B, the blower 100 is disposed downstream of the thermoelectric module 102. Thus, in the embodiment of FIG. 4B, the blower 100 is configured to blow air to the thermoelectric module 102 for treatment and further blow the treated air through the duct assembly 90 along the supply path as indicated by arrow SP. In this embodiment, the blown air is treated by the thermoelectric module 102 as propelled by the blower 100. The blower 100 further moves the treated air along the supply path SP from the central ventilation duct 98 to the first and second ventilation ducts 92, 94 of the duct assembly 90.

As shown in FIGS. 4A and 4B, the duct assembly 90 may include a first portion 90a that is contemplated to be an integrated part of the polymeric front portion 24a of the housing 24. Thus, the second ventilation duct 94 shown in FIGS. 4A and 4B may be integrally formed along a sidewall of the front portion 24a of the housing 24. As noted above, the housing 24 is contemplated to be an injection molded polymeric member, such that the first portion 90a of the duct assembly 90 may be integrally formed in the front portion 24a of the housing 24 in a molding procedure. Similarly, a second portion 90b of the duct assembly 90 may be integrally formed with the rear portion 24b of the housing 24. In this way, the duct assembly 90 is a multi-part duct assembly, wherein the front or first portion 90a and the second or rear portion 90b are coupled to one another at coupling portion 90c and in fluid communication with one another when the front and rear portions 24a, 24b of the housing 24 are coupled together.

Referring now to FIG. 4C, another embodiment of a temperature control system 30A is shown disposed within the housing 24 of the headrest assembly 20. In the embodiment shown in FIG. 4C, the temperature control system 30A includes a duct assembly 90 similar to that shown in FIGS. 4A and 4B described above. The central ventilation duct 98 of the duct assembly 90 is coupled to the blower 100 within the rear portion 24b of the housing 24. The rear portion 24b of the housing 24 includes a ventilated portion 122 disposed on a rear wall 124 of the rear portion 24b of the housing 24. The temperature control system 30A shown in FIG. 4C is contemplated to provide a ventilating effect by blowing air from a housing cavity 24c to the neck area NA through the duct assembly 90. The air is powered through the supply path SP of the duct assembly 90 by the blower 100. The ventilated portion 122 of the rear wall 124 of the housing 24 provides suitable ventilation for the housing 24 wherein ambient air can enter the cavity 24c of the housing 24 when the blower 100 is in use. Cavity 24c is defined between front portion 24a and rear portion 24b of the housing 24 when the front and rear portions 24a, 24b are coupled together. In this way, the temperature control system 30A may provide a ventilated feature for blowing air that has not been treated by a thermoelectric module into the neck area NA. The temperature control system 30A is configured to provide blown air as a standard fan would for providing a ventilating or cooling effect to a vehicle occupant.

Figure 4D:
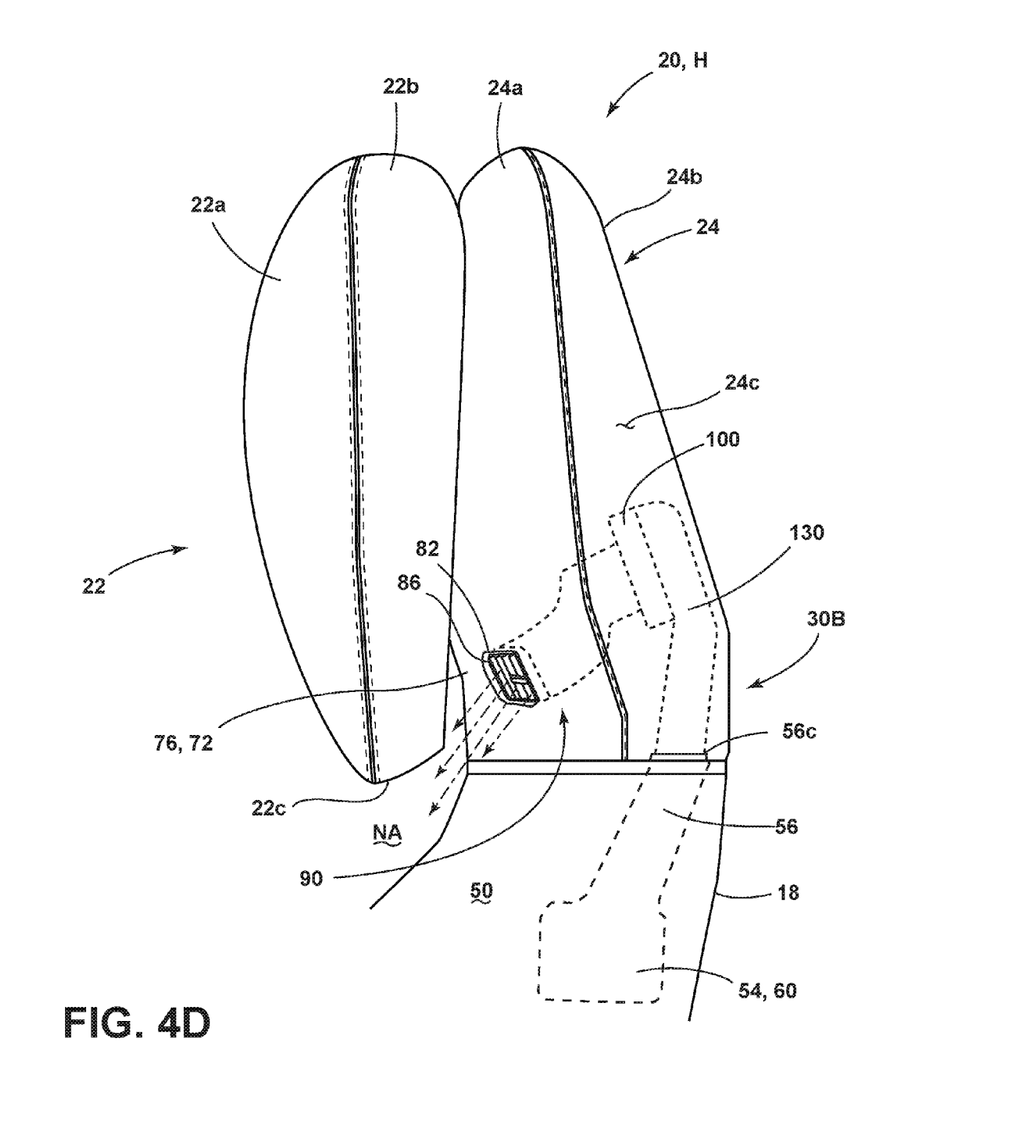
FIG. 4D is a side elevational view of a headrest assembly mounted on a seatback according to another embodiment, with a temperature control system shown in phantom.

Referring now to FIG. 4D, another embodiment of a temperature control system 30B is shown, wherein the headrest assembly 20 is substantially integrated with the seatback 18. As noted above, the seatback 18 may include a spacing 50 in which an air distribution system 54 and a thermoelectric module 60 may be disposed. In the embodiment shown in FIG. 4D, the air distribution system 54 and the thermoelectric module 60 are disposed in communication with an upper conduit 56 which extends upwardly from the spacing 50 of the seatback 18 to the housing cavity 24c of the housing 24. Within the housing cavity 24c, a connecting conduit 130 is shown extending downwardly from the blower 100 to a coupling portion 56c of the upper conduit 56 of the seatback 18. In this way, the connecting conduit 130 is in communication with the upper conduit 56 of the seatback 18 to provide treated air from the thermoelectric module 60 of the seatback 18 to the connecting conduit 130 of the headrest assembly 20. Once provided, the treated air flowing to through the connecting conduit 130 is blown up by the blower 100 through the duct assembly 90 for distribution about the neck area NA. In the embodiment shown in FIG. 4D, power for the air distribution system 54 and the thermoelectric module 60 may be provided and housed within the spacing 50 of the seatback 18, or some other location within the vehicle. The temperature control system 30B shown in FIG. 4D is also contemplated for use without the blower 100, as the air distribution system 54 may provide sufficient airflow to route treated air through the duct assembly 90 of the headrest assembly 20 to the neck area NA.

Figure 5:
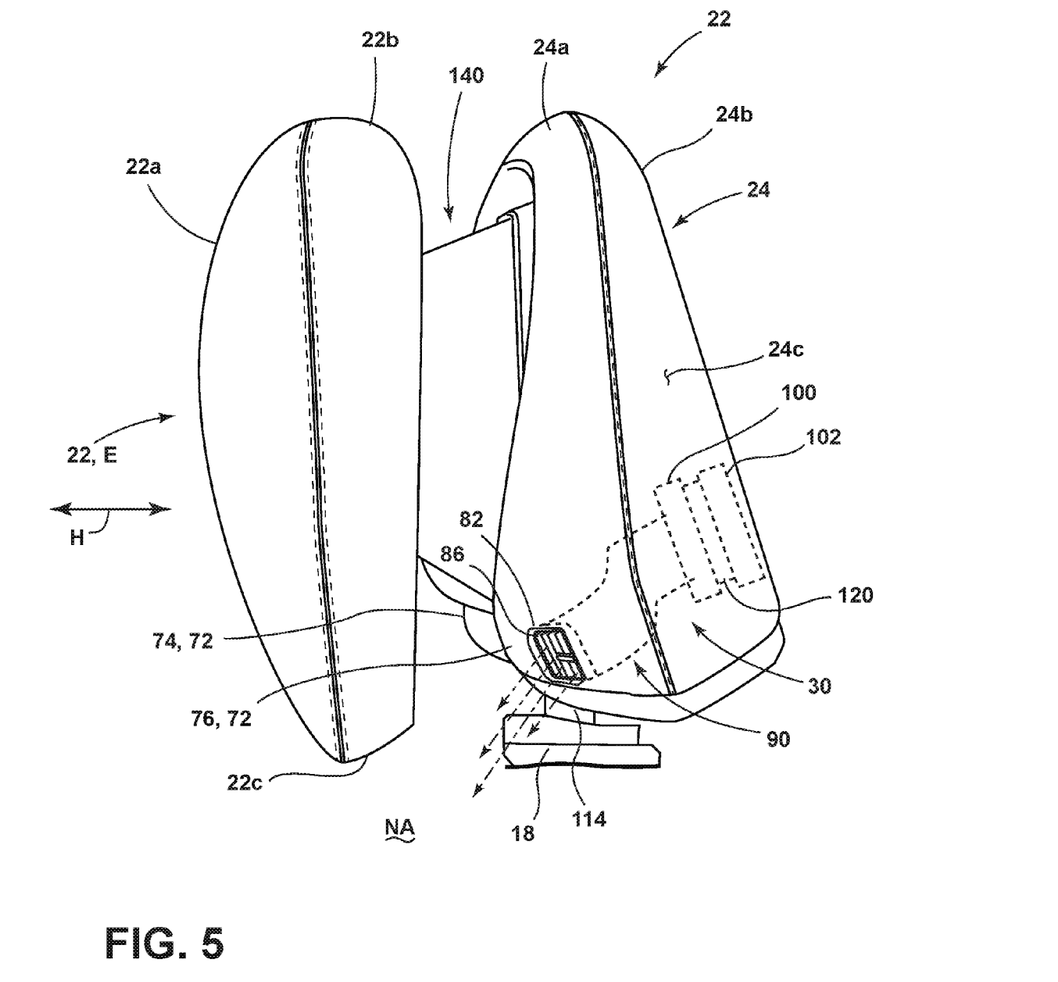
FIG. 5 is a side elevational view of the headrest of FIG. 4A with a headrest bun in an extended position.
Figure 6:
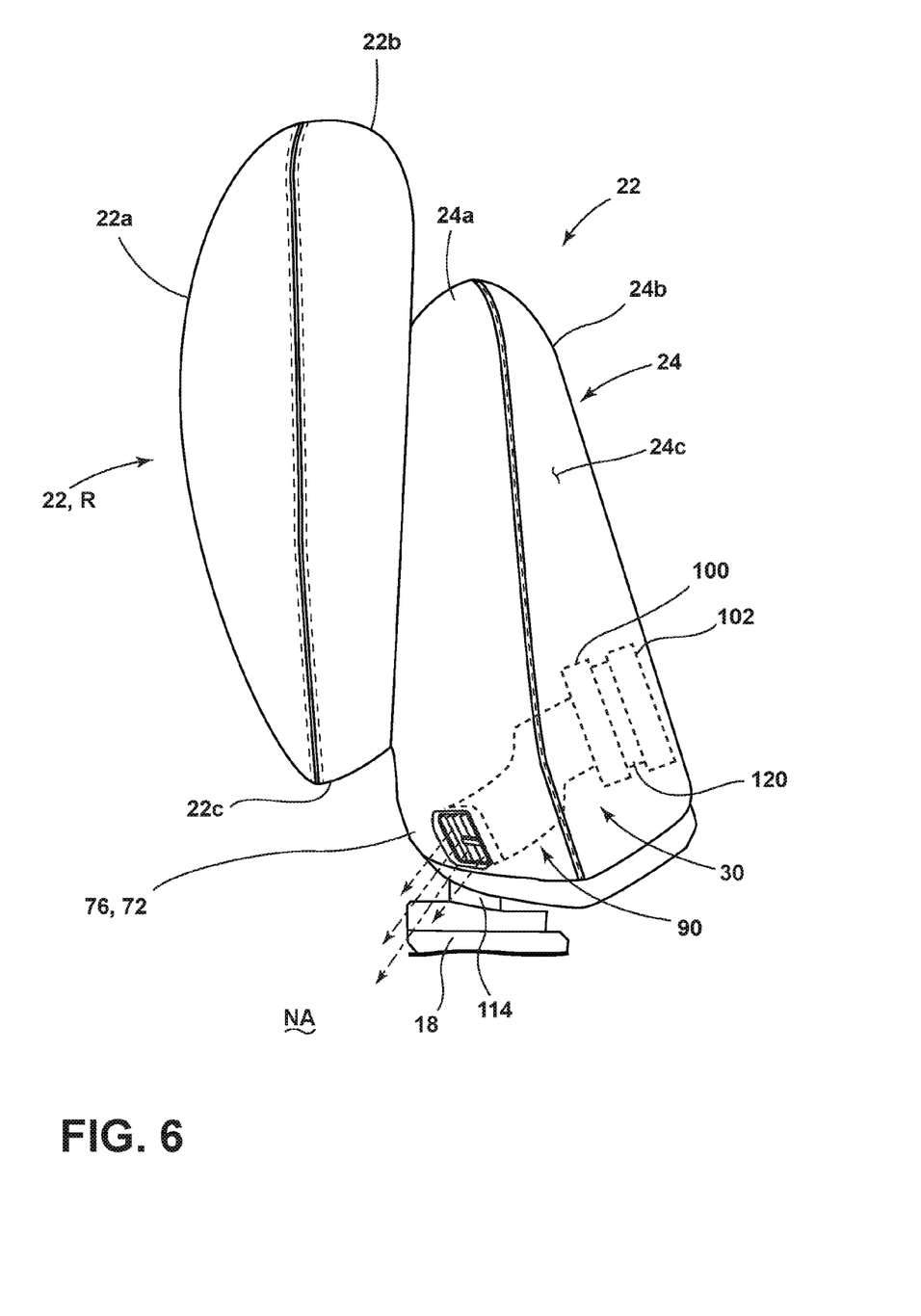
FIG. 6 a side elevational view of the headrest of FIG. 4A with the headrest bun in a raised position.

Referring now to FIG. 5, the headrest assembly 20 is shown with the headrest bun 22 in an extended position E. A cover assembly 140 is used to cover components of the linkage system that are normally housed within the housing 24, but are extended outwardly from the housing 24 when the headrest bun 22 is moved to the extended position E. The temperature control system 30 shown in FIG. 5 is still configured to provide treated air to a neck area NA with the headrest bun in the extended position E. Similarly, with reference to FIG. 6, the temperature control system 30 can provide treated air to the neck area NA when that the headrest bun 22 is in a raised position R. In this way, the air temperature control system 30 of the present concept is housed within the cavity 24c defined by the housing 24 along with suitable componentry configured to adjust a position of the headrest bun 22 between extended, retracted, raised and lowered positions. Given the confines of cavity 24c, the present invention provides a novel solution for providing a temperature control system 30 in an adjustable headrest assembly 20.

Referring now to FIG. 7A, the headrest assembly 20 is shown in the home position H with the headrest bun 22 shown in phantom. With the headrest bun 22 in phantom, first and second vents V1, V2 are shown disposed on the front wall 78 of the front portion 24a of the housing 24. The first and second vents V1, V2 are disposed on the lower portion 72 of the front portion 24a of the housing 24 on the first and second side 74, 76 thereof. The receiving recess 96 is defined between the first and second ventilation ducts 92, 94 of the duct assembly and is configured to receive a portion of a linkage system therein for adjusting a position of the headrest bun 22. The vent openings 80, 82 have vent covers 84, 86 disposed thereon which includes a plurality of serially aligned louvers 150 which are laterally adjustable via a handle 152. The louvers 150 shown in FIG. 7A are vertically aligned for movement between left and right directional positions as set by the user through engagement of the handle 152. As noted above, the vents V1, V2 are already directed for delivery of treated air downward towards the neck area NA, such that horizontal adjustment of the vent covers 84, 86 may not be necessary. Lateral adjustment between left and right positions via the handle 152 provides the user with a custom configuration for a desired heating, cooling or ventilating affect. As further shown in FIG. 7A, the blower 100 and thermoelectric module 102 are generally centrally disposed within the housing 24 for providing treated air to the vents V1, V2 on either side of the headrest assembly 20.

Referring now to FIG. 7B, the headrest assembly 20 is again shown in the home position H with the headrest bun 22 in phantom. The first and second vents V1, V2 are shown disposed on the front wall 78 of the front portion 24a of the housing 24 at the second side 90b of the duct assembly 90. The blower 100 and thermoelectric module 102 are shown disposed at the first side 90a of the duct assembly 90 near central ventilation duct 98. In FIG. 7B, a mounting plate 160 is shown and is used to couple the headrest bun 22 to the linkage system in assembly.

Figure 8A:
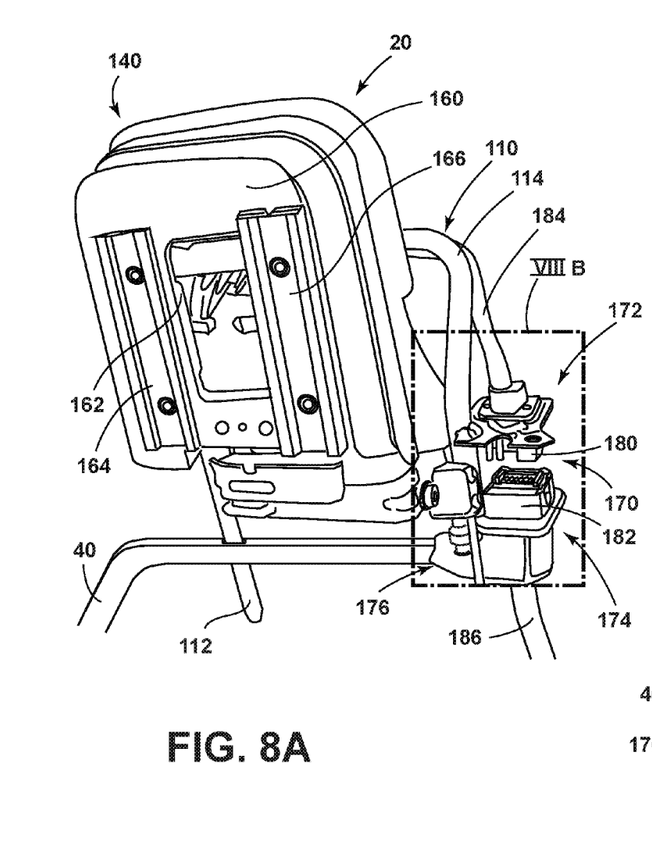
FIG. 8A is a front perspective view of the headrest assembly having the housing and headrest bun removed to reveal a structural member and a power connection clip.

Referring now to FIG. 8A, the headrest assembly 20 is shown without the rear housing or the headrest bun coupled thereto. In FIG. 8A, the support member 110 is shown being mounted on the seatback frame 40 at first and second support posts 112, 114. In the embodiment shown in FIG. 8A, support post 114 includes an upper clip member 172 of a power clip assembly 170. A lower clip member 174 is disposed on a structural member 176 that is mounted to the seatback frame 40. The upper clip member 172 includes a male clip assembly 180 that is configured to be received in a female clip assembly 182 disposed on the lower clip member 174. Lead 184 extends outwardly from the upper clip member 172 to provide power to the linkage system and the temperature control system 30. Lead 186 extends downwardly from the lower clip member 174, and is contemplated to connect with a vehicle power supply, such as a battery.

Figure 8B:
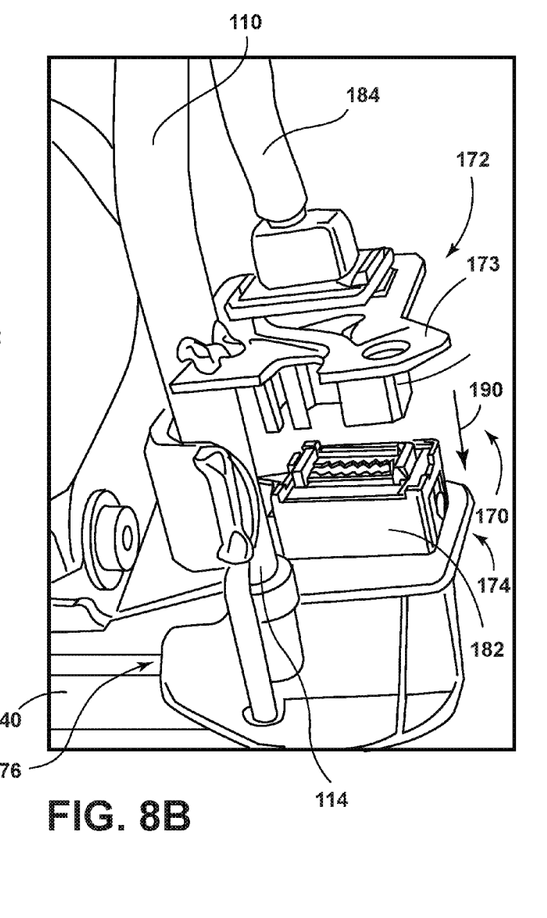
FIG. 8B is a front perspective view of the headrest assembly of FIG. 8A taken at location VIIIB.

Referring now to FIG. 8B, a plate 173 is welded to support post 114 and is configured to receive the upper clip member 172 thereon in a fixed manner. As support post 114 is moved downwardly in a direction as indicated by arrow 190, the upper clip member 172 will connect with the lower clip member 174, thereby providing electrical connections between male and female clip assemblies 180, 182. In this way, the headrest assembly 20 of the present invention can include powered mechanisms, such as the linkage system and air temperature control system 30, while still being a removable headrest assembly 20 from a seatback frame, such as seatback frame 40.

Figure 9A:
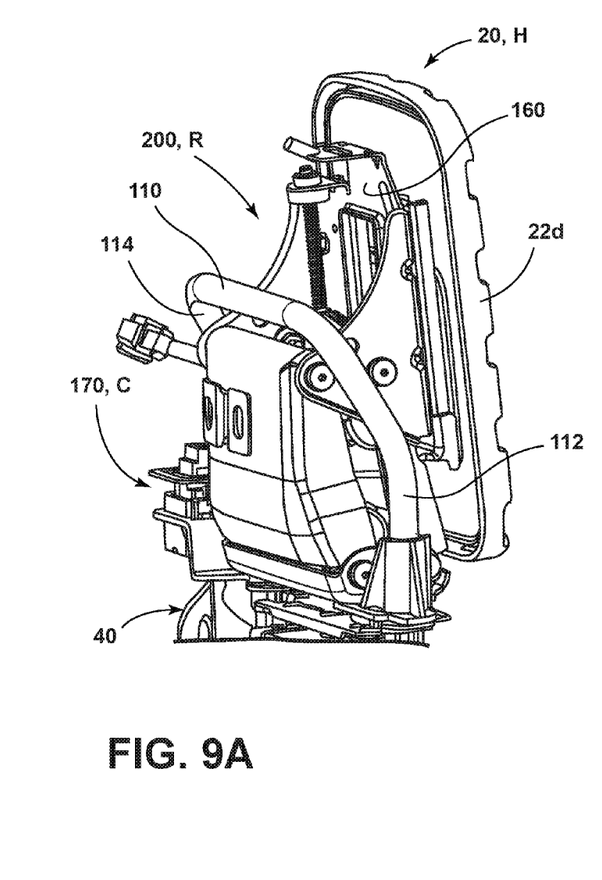
FIG. 9A is a rear perspective view of the headrest assembly of FIG. 4A with the headrest bun, housing, and temperature control system removed to reveal a linkage system in a retracted position.
Figure 9B:
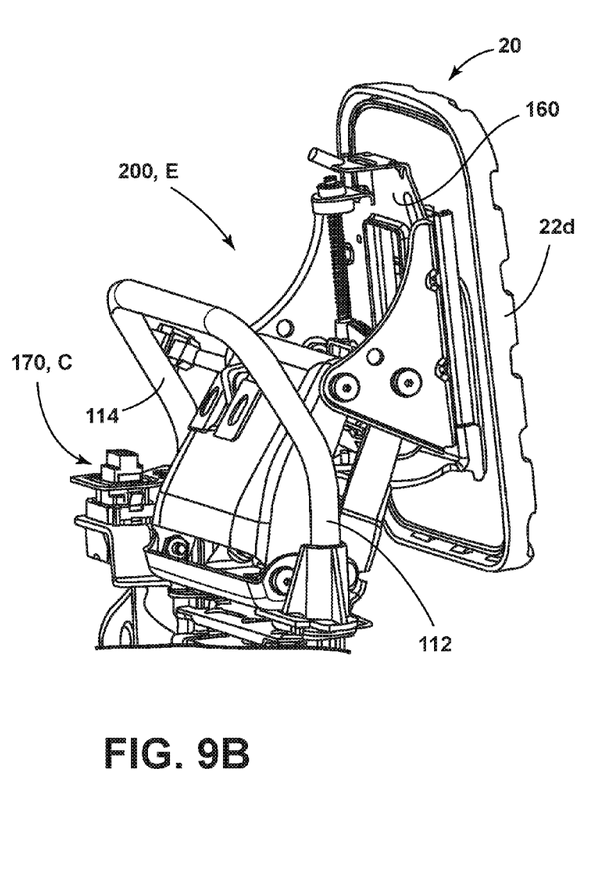
FIG. 9B is a rear perspective view of the headrest assembly of FIG. 9A with the linkage system in an extended position.

Referring now to FIG. 9A, the mounting plate 160 is shown coupled to the linkage system 200. The linkage system 200 is shown in FIG. 9A in the retracted position and a support plate 22d is shown coupled to the mounting plate 160. The support plate 22d is used to couple the headrest bun 22 to the linkage system 200 in assembly. The headrest assembly 20 is shown in the home position H in FIG. 9A and the support member 110 is fully received on the seatback frame 40, such that the power clip assembly 170 is in a connected position C for powering adjustment mechanisms of the linkage assembly. Referring now to FIG. 9A, the linkage system 200 is shown in the extended position E for providing extended support of the headrest bun 22 in assembly.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

We claim:

1. A headrest assembly, comprising:
    a housing;
    a headrest bun operably coupled to the housing in a horizontally adjustable manner between extended and retracted positions relative to the housing;
    a duct assembly disposed in the housing;
    a thermoelectric module in communication with the duct assembly and configured to provide treated air; and
    one or more vents positioned on the housing to deliver the treated air to a conditioning area disposed below the headrest bun.

2. The headrest assembly of claim 1, wherein the duct assembly includes first and second sides, and further wherein the thermoelectric module is disposed on the first side of the duct assembly.

3. The headrest assembly of claim 2, wherein the second side of the duct assembly includes first and second ventilation ducts that are spaced apart from one another to define a receiving recess therebetween.

4. The headrest assembly of claim 3, wherein the one or more vents include first and second vents operably coupled to the first and second ventilation ducts of the duct assembly, respectively.

5. The headrest assembly of claim 4, including:
    vent covers disposed on the first and second vents, wherein the vent covers are configured to direct delivery of the treated air and are laterally adjustable.

6. The headrest assembly of claim 1, including:
    a blower configured to blow treated air along the duct assembly.

7. The headrest assembly of claim 6, wherein the blower is positioned behind the thermoelectric module.

8. The headrest assembly of claim 6, wherein the blower is positioned in front of the thermoelectric module.

9. The headrest assembly of claim 8, including:
    a collection compartment disposed between the blower and the thermoelectric module.

10. A headrest assembly removeably supported on a seat having a seatback with a seatback frame, the headrest assembly comprising:
    a headrest bun operably coupled to a housing via a linkage system for driving the headrest bun horizontally between extended and retracted positions;
    a temperature control system disposed in the housing and configured to provide treated air to a conditioning area disposed below the headrest bun, the temperature control system comprising:
    a blower operably coupled to duct assembly for blowing treated air along the duct assembly; and
    one or more vents disposed at a downward angle on a front portion of the housing, the one or more vents in communication with the duct assembly.

11. The headrest assembly of claim 10, including
    a thermoelectric module for treating air, wherein the thermoelectric module is operably coupled to the blower and the duct assembly.

12. The headrest assembly of claim 11, wherein the one or more vents include first and second vents operably coupled to first and second ventilation ducts of the duct assembly, respectively.

13. The headrest assembly of claim 12, wherein the first and second ventilation ducts of the duct assembly branch off of a central ventilation duct that is operably coupled to the thermoelectric module and the blower.

14. The headrest assembly of claim 10, including:
    a support member having first and second support posts, wherein the first and second support posts are removeably received in the seatback frame.

15. The headrest assembly of claim 14, including:
    a power clip assembly for powering the linkage system and the temperature control system, the power clip assembly having an upper clip member and lower clip member, wherein the upper clip member is disposed on the headrest assembly on one of the first support post and the second support post, and further wherein the lower clip member is disposed on the seatback frame.

16. The headrest assembly of claim 10, including:
a second temperature control system disposed in the seatback having an upper conduit operably coupled to the blower within the housing of the headrest assembly.

17. A headrest assembly, comprising:
a housing;
a headrest bun horizontally adjustable between extended and retracted positions relative to the housing via a powered linkage system; and
a temperature control system having a blower coupled to a duct assembly for delivering air from one or more vents disposed on the housing to a conditioning area disposed below the headrest bun.

18. The headrest assembly of claim 17, wherein the housing includes a front portion coupled to a rear portion to define a housing cavity, and further wherein the rear portion includes a ventilated portion.

19. The headrest assembly of claim 17, including
a thermoelectric module for heating or cooling air, wherein the thermoelectric module is operably coupled to the blower and the duct assembly.

20. The headrest assembly of claim 17, wherein the duct assembly is integrally formed in the housing.

* * * * *